United States Patent

Kai et al.

[11] Patent Number: 6,164,833
[45] Date of Patent: Dec. 26, 2000

[54] LOW FRICTION BALL-BEARING HOLDER DEVICE FOR SMALL MOTORS

[75] Inventors: Kazuo Kai, Osaka; Tadashi Ishizuka; Nobuyuki Ayuba, both of Gunma-ken, all of Japan

[73] Assignee: Tokyo Parts Industrial Co., Ltd., Gunma-ken, Japan

[21] Appl. No.: 09/366,243

[22] Filed: Aug. 3, 1999

[30] Foreign Application Priority Data

Aug. 3, 1998 [JP] Japan ................... 10-218386
Feb. 8, 1999 [JP] Japan ................... 11-030411

[51] Int. Cl.⁷ ........................................ F16C 19/08
[52] U.S. Cl. ................................................ 384/518
[58] Field of Search .......................... 384/518, 517, 384/563, 514, 571

[56] References Cited

U.S. PATENT DOCUMENTS

4,993,851  2/1991  Nakanishi ..................... 384/512
5,628,571  5/1997  Ohta et al. ................... 384/518

Primary Examiner—Lenard A. Footland
Attorney, Agent, or Firm—Knoble & Yoshida, LLC

[57] ABSTRACT

A small cored motor has a ball bearing which is a relatively long life, the overall thin dimension, a low manufacturing cost, low-friction as well as substantially vibration-free rotation. The ball bearing includes a biased and movable portion for promoting low-friction and substantially vibration-free rotation as well as a ball retainer for separating balls apart at a predetermined distance.

3 Claims, 8 Drawing Sheets

LOW FRICTION BALL-BEARING HOLDER DEVICE FOR SMALL MOTORS

Priority is claimed under 35 U.S.C. §119 based upon Japanese Patent application Serial Nos. Hei 11-30411 and Hei 10-218386, which were respectively filed on Feb. 8, 1999 and; Aug. 3, 1998, the disclosures of which are hereby incorporated by reference as if fully set forth within.

BACKGROUND OF THE INVENTION

1. Field of the Invention

The current invention is generally related to small motors used for various portable devices and is particularly related to certain parts for holding a shaft with substantially reduced friction in the motors.

2. Description of the Prior Art

A number of small cored motors have been proposed to include rolling bearings and sliding bearings. For example, balls are packed between an outer circle and an inner circle which are fixed in a case or a base/bearing housing. A rotating shaft is supported by these ball bearing units in a cored motor. The size of these ball bearing units increases in proportion to the shaft size not only in the unit width but also in the unit height. The increased unit height is not compatible with dimensional requirements for a thin or flat small motor. The above ball bearing units are also costly for commercial production. To improve these shortcomings of the ball bearing units, a small cored motor includes sintering oil-containing metal as a bearing in the prior art.

Figure 1:
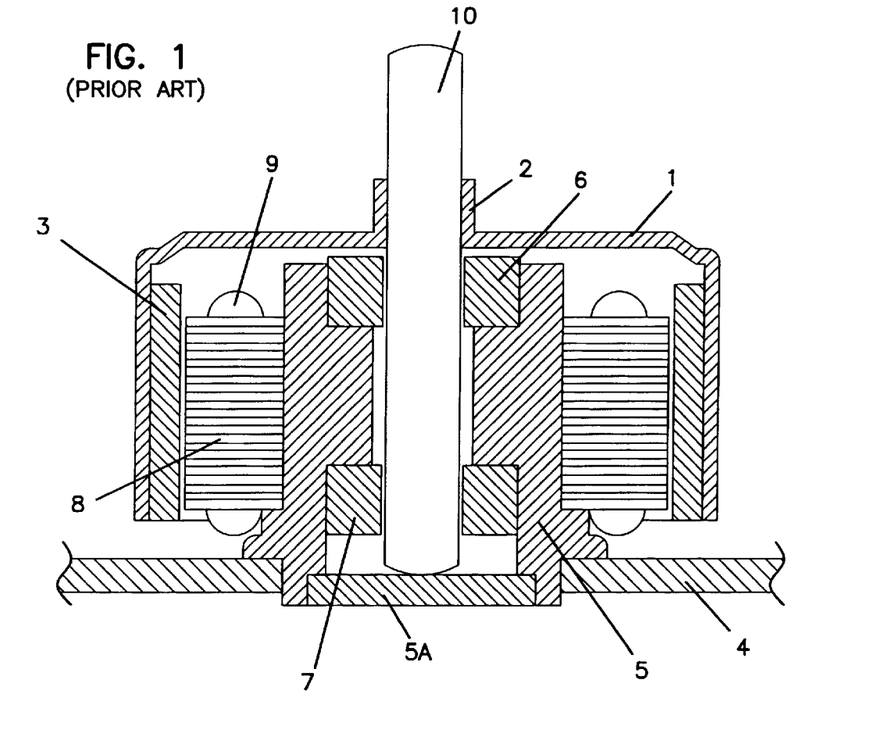
FIG. 1 shows a prior art cored motor with sintering oil-containing metal bearings.

Referring to FIG. 1, a cored motor with the sintering oil-containing metal bearing is illustrated in a cross sectional view. A housing unit 1 is a dorm-shaped part and includes a centrally located fixed short cylindrical portion 2 for supporting a shaft 10. The housing unit 1 also includes a ring magnet portion 3, which is located on inside circumference areas of the housing unit 1. A stator base 4 supports a cylindrical bearing housing unit 5, and the cylindrical bearing housing unit 5 holds a first sintering oil-containing metal bearing 6 at a upper portion as well as a second sintering oil-containing metal bearing 7 at a lower portion. A receiving plate 5a is located at the bottom of the bearing housing unit 5 and receives one end of the shaft 10. Stator core 8 is located around an armature coil 9 outside the bearing housing unit 5.

Figure 2:
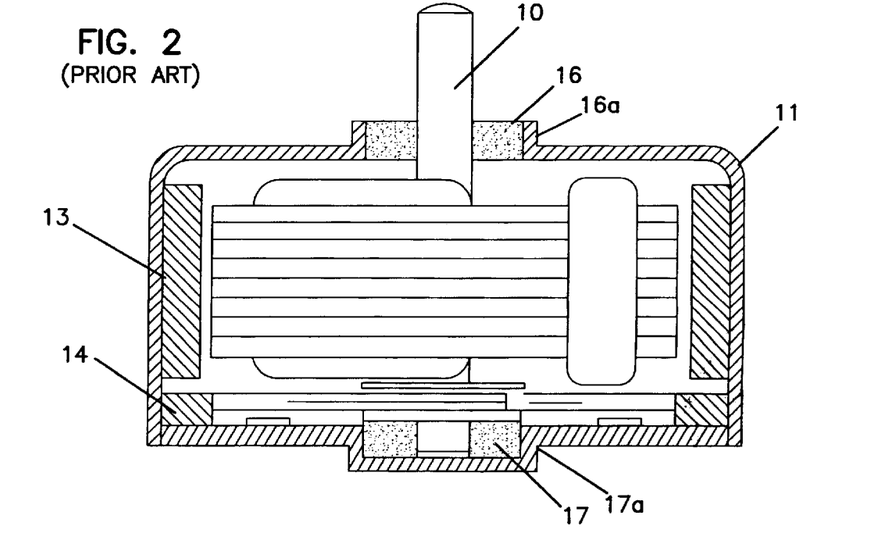
FIG. 2 shows another prior art cored motor with sintering oil-containing metal bearings.

Another prior art cored motor is shown in FIG. 2, another cored motor with the sintering oil-containing metal bearing is illustrated in a cross sectional view. A housing unit 11 is a dorm-shaped part and includes a centrally located fixed short cylindrical portion 16a for supporting a shaft 10. The housing unit 1 also includes a ring magnet portion 13, which is located on inside circumference areas of the housing unit 11. A stator base 14 includes a centrally located fixed short cylindrical portion 17a for supporting a shaft 10. The upper cylindrical bearing housing portion 16a holds a first sintering oil-containing metal bearing 16. The lower cylindrical bearing housing portion 17a holds a second sintering oil-containing metal bearing 17.

In the above described cored motors, friction between the shaft 10 and the sintering oil-containing metal bearings 6, 7 or 16, 17 is substantial at a high rotational speed. As a result of the friction, because the bearings have a relatively short life, the cored motors themselves also have a relatively short life.

SUMMARY OF THE INVENTION

In order to solve the above and other problems, according to one aspect of the current invention, a ball bearing for supporting a shaft in a motor, including: a plurality of balls; a bearing housing unit located adjacent to the shaft, said bearing housing unit having a first ball holding surface at a first predetermined angle with respect to a longitudinal axis of the shaft for keeping each of said balls in contact with the shaft; and
a biased movable ball holding portion located near said first ball holding surface, said biased movable ball holding portion having a second ball holding surface at a second predetermined angle with respect to the longitudinal axis of the shaft for urging each of said balls towards the shaft.

According to a second aspect of the current invention, a ball bearing for supporting a shaft in a motor, including: a plurality of balls; a bearing housing unit located adjacent to the shaft, said bearing housing unit having a ball holding indentation surface for guiding each of said balls in contact with the shaft; and a ball retainer portion located between said ball holding indentation surface and the shaft, said ball retainer portion having a second ball holding surface for maintaining a constant distance between said balls.

DETAILED DESCRIPTION OF PREFERRED EMBODIMENTS

Figure 3:
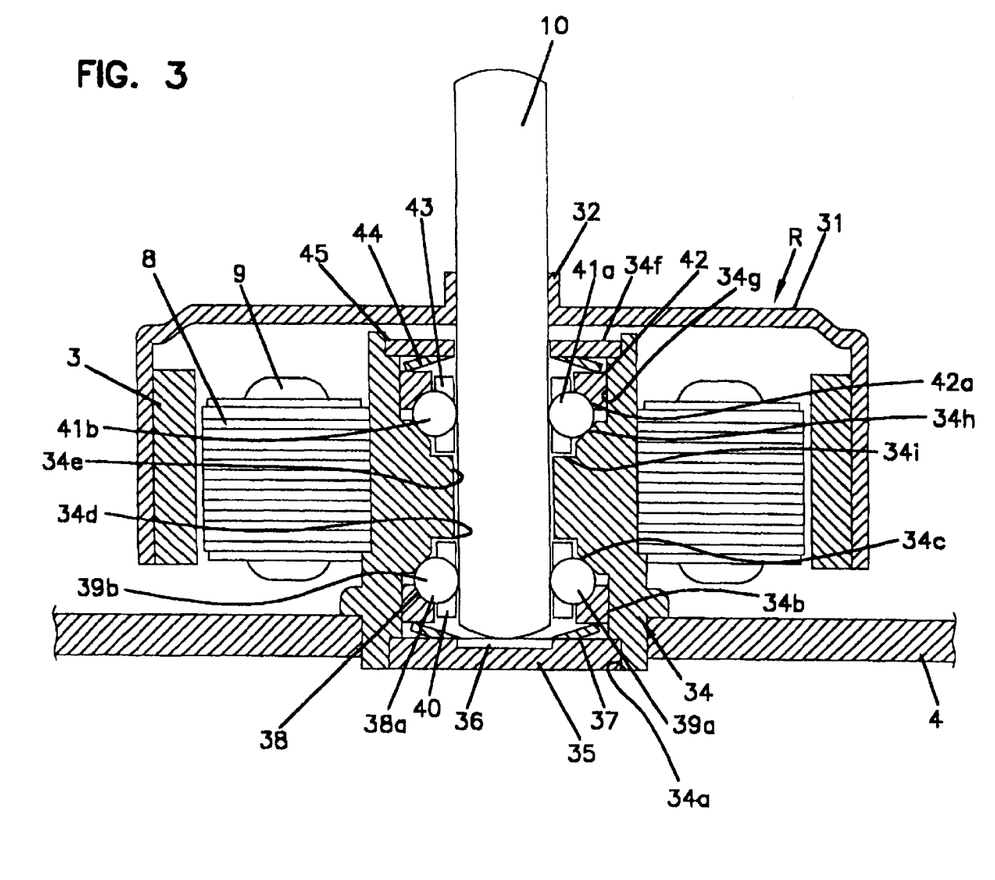
FIG. 3 illustrates one preferred embodiment of the low friction ball bearing according to the current invention in a cross sectional view of a small cored motor.

Referring now to the drawings, wherein like reference numerals designate corresponding structure throughout the views, and referring in particular to FIG. 3, one preferred embodiment of the low friction ball bearing according to the current invention is illustrated in a cross sectional view of a small cored motor. A cored motor includes a dorm-shaped housing unit 31 and includes a centrally located fixed short cylindrical portion 32 for supporting a shaft 10. The housing unit 31 also includes a ring magnet portion 3, which is located on inside circumference areas of the housing unit 31. The motor housing unit 31 and the ring magnet 3 together form a rotor R. A stator base 4 supports a cylindrical bearing housing unit 34, and the cylindrical bearing housing unit 34 has a cone-like opening at each end. In other words, the diameter of the opening reduces toward the center of the cylindrical bearing housing unit 34 in a longitudinal direction. The opening on the side of the stator base 4 includes a first opening 34a, a second opening 34b, a tapered part or an angled ball holding surface 34c, a third opening 34d, and a forth opening 34e. The first opening 34a has the largest diameter among the openings 34a–e while the fourth opening 34e has the smallest diameter. The diameter of the fourth opening 34e is slightly larger than that of the shaft 10. Similarly, the opening on the free-end side opposite the stator base 4 includes a first free-end opening 34f, a second free-end opening 34g, a tapered free-end part or a free-end angled ball holding surface 34h and a third free-end opening 34i. A receiving plate 35 is located at the bottom of the bearing housing unit 34 and is integral with the first free-end opening 34a. The receiving plate 35 includes a shaft thrust bearing 36, which contacts one end of the shaft 10. Stator core 8 is located around an armature coil 9 outside the bearing housing unit 34.

Still referring to FIG. 3, one preferred embodiment of the ball bearing according to the current invention is described more fully in the following. The ball bearing includes a first donut-shaped plate spring 37, whose one end is located on the receiving plate 35 and whose the other end urges against the first movable ball holding portion 38. The first movable ball holding portion 38 is a ring located in the second opening 34b and has an upper angled surface 38a with respect to the longitudinal axis of the shaft 10. As the first movable ball holding portion 38 vertically slides, balls 39a and 39b are urged towards the shaft 10 to make a contact. In addition, the ball bearing housing unit 34 includes the first ball holding surface 34c at a predetermined angle with respect to a longitudinal axis of the shaft 10 for keeping the balls 39a and 39b in contact with the shaft 10. In summary, the ball holding surface 34c, the first movable ball holding portion 38 and the shaft 10 together restrict the movement of the balls 39a and 39b in both vertical as well as horizontal directions. A retainer 40 also restricts a distance between the balls 39a, 39b and the shaft 10.

Similarly, on the free-end side of the shaft 10, the ball bearing includes a second donut-shaped plate spring 44, whose one end is located on a top plate 45 and whose the other end urges against a second movable ball holding portion 42. The second movable ball holding portion 42 is a ring located in the free-end second opening 34g and has an upper angled surface 42a with respect to the longitudinal axis of the shaft 10. As the second movable ball holding portion 42 vertically slides, balls 41a and 41b are urged towards the shaft 10 to make a contact. In addition, the ball bearing housing unit 34 includes the second ball holding surface 34h at a predetermined angle with respect to a longitudinal axis of the shaft 10 for keeping the balls 41a and 41b in contact with the shaft 10. In summary, the second ball holding surface 34h, the second movable ball holding portion 42 and the shaft 10 together restrict the movement of the balls 41a and 41b in both vertical as well as horizontal directions. A second retainer 43 also restricts a distance between the balls 41a, 41b and the shaft 10.

As described above, since the first donut-shaped plate spring 37 upwardly urges a bottom surface of the first movable ball holding portion 38, the first movable ball holding portion 38 slides in the second opening 34b. The first movable ball holding portion 38 together with the angled ball holding surface 34c urge the balls 39a and 39b towards the shaft 10 and hold each of the balls 39a and 39b at three points of contact. Similarly, since the second donut-shaped plate spring 44 downwardly urges a top surface of the second movable ball holding portion 42, the second movable ball holding portion 42 slides in the second opening 34g. The second movable ball holding portion 42 together with the second angled ball holding surface 34h urge the balls 41a and 41b towards the shaft 10 and hold each of the balls 41a and 41b at three points of contact. These features of the preferred embodiment enable a small cored motor to have the ball bearing having a relatively long life, the overall thin dimension, a low manufacturing cost, low-friction as well as substantially vibration-free rotation.

Figure 4:
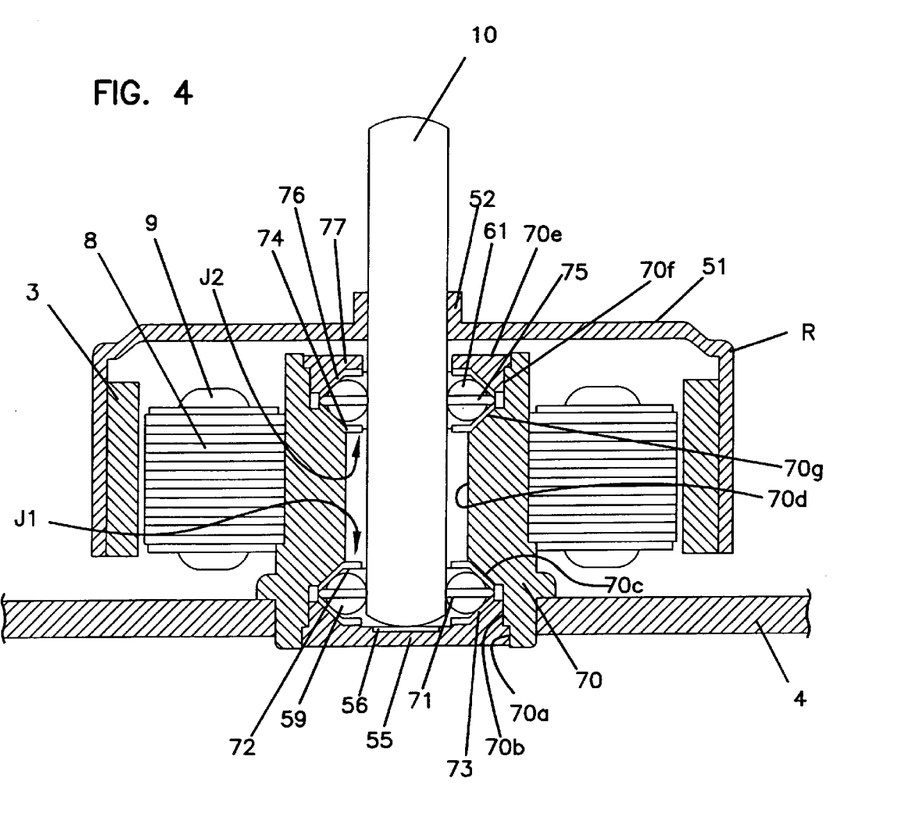
FIG. 4 illustrates a second preferred embodiment of the low friction ball bearing according to the current invention in a cross sectional view of a small cored motor.

Now referring to FIG. 4, a second preferred embodiment of the low friction ball bearing according to the current invention is illustrated in a cross sectional view of a small cored motor. A cored motor includes a dorm-shaped housing unit 51 and includes a centrally located fixed short cylindrical portion 52 for supporting a shaft 10. The housing unit 51 also includes a ring magnet portion 3, which is located on inside circumference areas of the housing unit 51. The motor housing unit 51 and the ring magnet 3 together form a rotor R. A stator base 4 supports a cylindrical bearing housing unit 70, and the cylindrical bearing housing unit 70 has a cone-like opening at each end. In other words, the diameter of the opening reduces toward the center of the cylindrical bearing housing unit 70 in a longitudinal direction. The opening on the side of the stator base 4 includes a first opening 70a, a second opening 70b, a tapered part or an angled ball holding surface 70c and a third opening 70d. The first opening 70a has the largest diameter among the openings 70a–d while the third opening 34d has the smallest diameter. Similarly, the opening on the free-end side opposite the stator base 4 includes a first free-end opening 70e, a second free-end opening 70f, and a tapered free-end part or a free-end angled ball holding surface 70g. A receiving plate 55 is located at the bottom of the bearing housing unit 70 and is integral with the first free-end opening 70a. The receiving plate 55 includes a shaft thrust bearing 56, which contacts one end of the shaft 10. Stator core 8 is located around an armature coil 9 outside the bearing housing unit 70.

Figure 5:
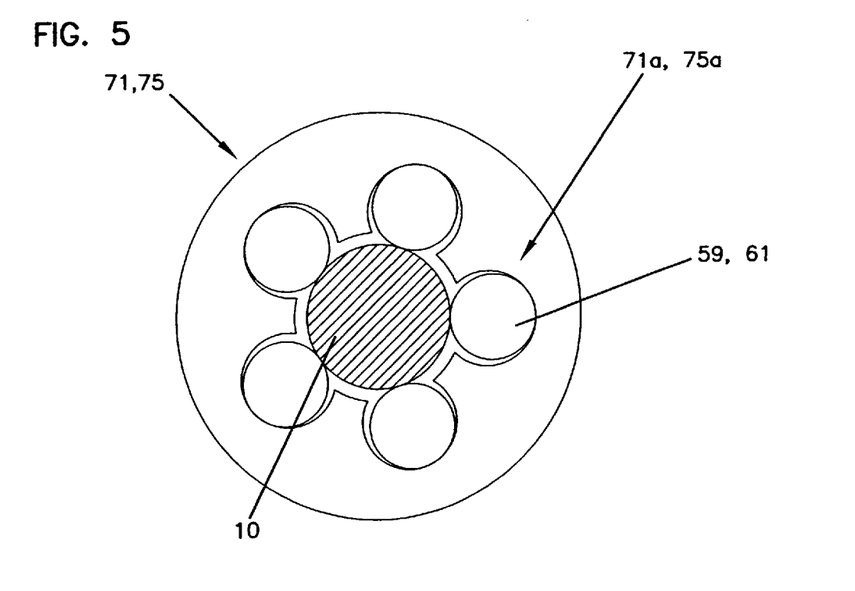
FIG. 5 is a top view illustrating one exemplary ball retainer.

Still referring to FIG. 4, one preferred embodiment of the ball bearing according to the current invention is described more fully in the following. The ball bearing J1 includes first tapered plate springs 72 and 73, which are identical in structure and facing each other. In assembling the ball bearing, since a tapered portion of the top first tapered plate spring 72 is placed against the angled ball holding surface 70c, the first tapered plate spring 72 is immobilized. In addition, because the first tapered plate spring 72 covers the angled ball holding surface 70c, the angled ball holding surface 70c does not need to be polished. Then, after a disk-shaped ball retainer 71 is inserted, a predetermined number of balls 59 is inserted in ball holding portions of the ball retainer 71. The ball retainer 71 maintains a predetermined horizontal distance between the balls 59. A top view of the ball retainer 71 is shown in FIG. 5. Lastly, the bottom first tapered plate spring 73 is placed on the stator base side opposite the top first tapered plate spring 72 to cover the balls 59. Lubrication oil may be applied as necessary. To stabilize the above structure, the receiving plate is pressure fit in the first opening 70a of the ball bearing housing unit 70. As the position of the bottom first tapered plate spring 73 is determined with respect to the ball bearing housing unit 70, a tapered portion of the bottom first tapered plate spring 73 pushes the balls 59 towards a tapered portion of the top first tapered plate spring 72. These two tapered portions of the first tapered plate springs 72 and 73 and the shaft 10 together at three points of contacts restrict the position of the balls 59. Thus the balls 59 rotate around the shaft 10 while their horizontal distance is maintained by the ball retainer 71.

Similarly, on the free-end side of the shaft 10, the ball bearing J2 includes second tapered plate springs 74 and 76, which are identical in structure and facing each other. In assembling the ball bearing, since a tapered portion of the bottom second tapered plate spring 74 is placed against the angled ball holding surface 70g, the second tapered plate spring 74 is immobilized. In addition, because the second bottom tapered plate spring 74 covers the angled ball holding surface 70g, the angled ball holding surface 70g does not need to be polished. Then, after a disk-shaped ball retainer 75 is inserted, a predetermined number of balls 61 is inserted in ball holding portions of the ball retainer 75. The ball retainer 75 maintains a predetermined horizontal distance between the balls 61. A top view of the ball retainer 75 is also shown in FIG. 5. Lastly, the top second tapered plate spring 76 is placed the bottom first tapered plate spring 74 to cover the balls 61. Lubrication oil may be applied as necessary. To stabilize the above structure, a holding plate 77 is press fit in the first opening 70g of the ball bearing housing unit 70. As the position of the top second tapered plate spring 76 is determined with respect to the ball bearing housing unit 70, a tapered portion of the top second tapered plate spring 76 pushes the balls 61 towards a tapered portion of the bottom second tapered plate spring 74. These two tapered portions of the second tapered plate springs 74 and 76 and the shaft 10 together at three points of contacts restrict the position of the balls 61. Thus the balls 61 rotate around the shaft 10 while their horizontal distance is maintained by the ball retainer 75. The described features of the second preferred embodiment also enable a small cored motor to have the ball bearing having a relatively long life, the overall thin dimension, a low manufacturing cost, low-friction as well as substantially vibration-free rotation.

Now referring to FIG. 5, a top view of one example of the ball retainer 71 and 75 as referred to in FIG. 4 is illustrated with the shaft 10 and balls 59, 61. This exemplary ball retainer has five ball holding portions 71a or 75a for holding a ball so as to maintain a predetermined distance between the balls. The ball retainer 71 and 75 can be rotatable with respect to the shaft 10. The ball retainer 71 and 75 do not contact the shaft 10 while the balls 59, 61 contact the shaft 10.

Figure 6:
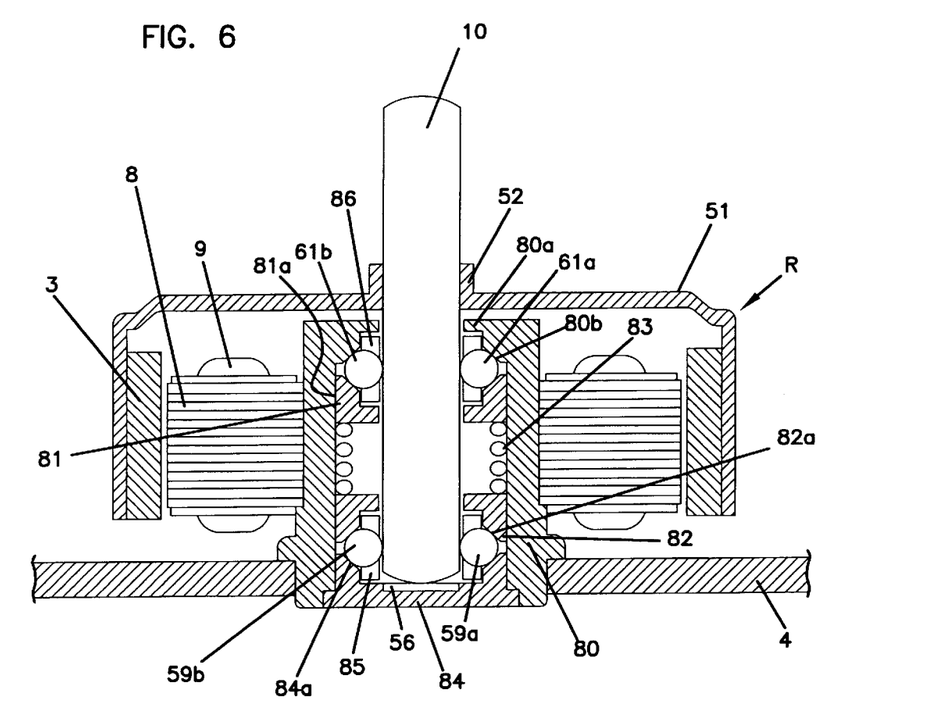
FIG. 6 illustrates a third preferred embodiment of the low friction ball bearing according to the current invention in a cross sectional view of a small cored motor.

Now referring to FIG. 6, a third preferred embodiment of the low friction ball bearing according to the current invention is illustrated in a cross sectional view of a small cored motor. A cored motor includes a dorm-shaped housing unit 51 and includes a centrally located fixed short cylindrical portion 52 for supporting a shaft 10. The housing unit 51 also includes a ring magnet portion 3, which is located on inside circumference areas of the housing unit 51. The motor housing unit 51 and the ring magnet 3 together form a rotor R. A stator base 4 supports a cylindrical bearing housing unit 80, and the cylindrical bearing housing unit 80 has an opening at each end. A receiving plate 84 is located at the bottom of the bearing housing unit 80 and includes a shaft thrust bearing 56, which contacts one end of the shaft 10. Stator core 8 is located around an armature coil 9 outside the bearing housing unit 80.

Still referring to FIG. 6, the third preferred embodiment of the ball bearing according to the current invention is described more fully in the following. The ball bearing includes a first movable ball holding portion 82. The first movable ball holding portion 82 is a ring located inside the bearing housing unit 80 near the receiving plate 84 and has an angled surface 82a with respect to the longitudinal axis of the shaft 10. In addition, the receiving plate 84 includes the first ball holding surface 84a at a predetermined angle with respect to a longitudinal axis of the shaft 10 for keeping the balls 59a and 59b in contact with the shaft 10. A resilient coil spring or bias spring 83 urges the first movable ball holding portion 82 towards the receiving plate 84. As the first movable ball holding portion 82 vertically slides towards the receiving plate 84, balls 59a and 59b are urged towards the shaft 10 to make a contact. In summary, the first ball holding surface 84a, the first movable ball holding portion 82 and the shaft 10 together restrict the movement of the balls 59a and 59b in both vertical as well as horizontal directions. A ball retainer 85 also restricts a distance between the balls 59a, 59b and the shaft 10. These two tapered portions 82a and 84a and the shaft 10 together at three points of contacts restrict the position of the balls 59a and 59b.

Similarly, on the free-end side of the shaft 10, the third preferred embodiment of the ball bearing according to the current invention is described more fully in the following. The ball bearing includes a second movable ball holding portion 81. The second movable ball holding portion 81 is a ring located inside the bearing housing unit 80 near the top of bearing housing unit 80 and has an angled surface 81a with respect to the longitudinal axis of the shaft 10. In addition, the bearing housing unit 80 includes a second ball holding surface 80b at a predetermined angle with respect to a longitudinal axis of the shaft 10 for keeping the balls 61a and 61b in contact with the shaft 10. The other end of the resilient coil spring or bias spring 83 urges the second movable ball holding portion 81 towards a top surface of the housing unit 51. As the second movable ball holding portion 81 vertically slides away from the receiving plate 84, balls 61a and 61b are urged towards the shaft 10 to make a contact. In summary, the second ball holding surface 81a, the second movable ball holding portion 81 and the shaft 10 together restrict the movement of the balls 61a and 61b in both vertical as well as horizontal directions. A ball retainer 86 also restricts a distance between the balls 61a, 61b and the shaft 10. These two tapered portions 81a and 80b and the shaft 10 together at three points of contacts restrict the position of the balls 61a and 61b. Since the coil spring 83 is shared for the first and second movable ball holding portion 82 and 81, the construction of the third preferred embodiment of the ball bearing according to the current invention is simplified.

Figure 7:
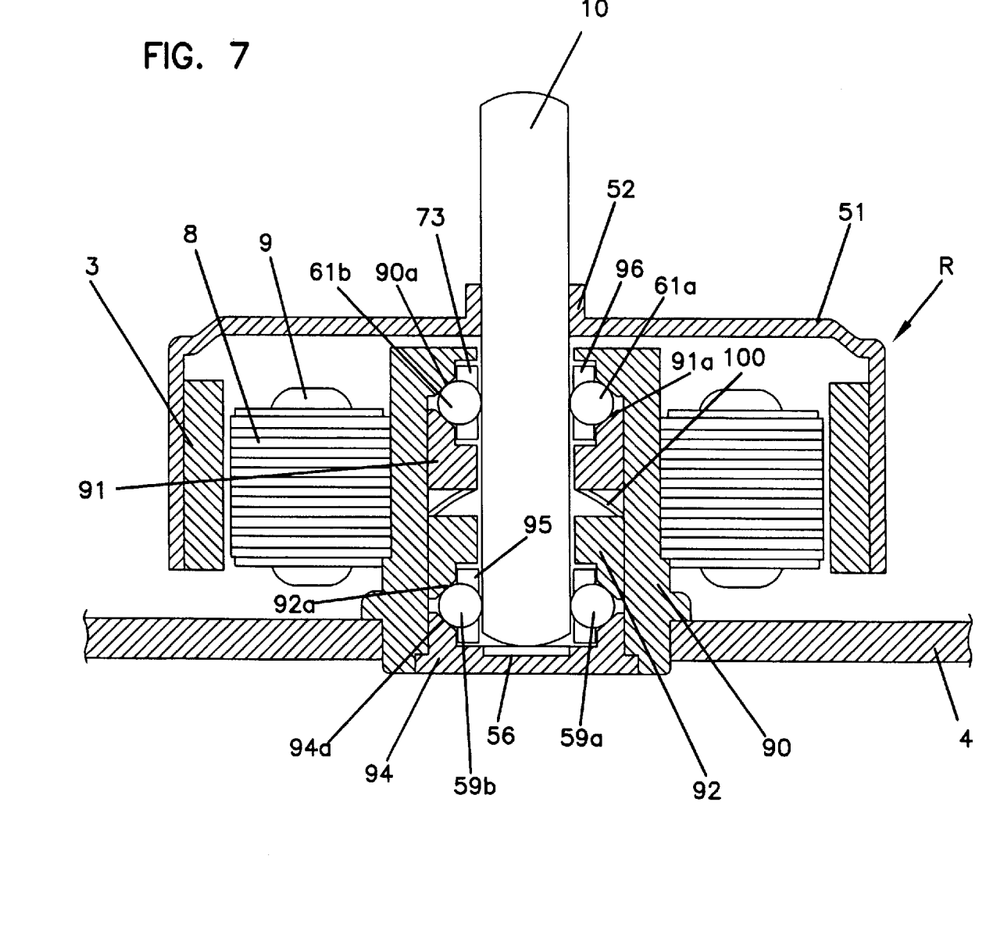
FIG. 7 illustrates a fourth preferred embodiment of the low friction ball bearing according to the current invention in a cross sectional view of a small cored motor.

Now referring to FIG. 7, a fourth preferred embodiment of the low friction ball bearing according to the current invention is illustrated in a cross sectional view of a small cored motor. The fourth preferred embodiment is substantially identical to the above described third preferred embodiment except for the a donut-shaped spring 100 in stead of the coil spring. A cored motor includes a dorm-shaped housing unit 51 and includes a centrally located fixed short cylindrical portion 52 for supporting a shaft 10. The housing unit 51 also includes a ring magnet portion 3, which is located on inside circumference areas of the housing unit 51. The motor housing unit 51 and the ring magnet 3 together form a rotor R. A stator base 4 supports a cylindrical bearing housing unit 90, and the cylindrical bearing housing unit 90 has an opening at each end. A receiving plate 94 is located at the bottom of the bearing housing unit 90 and includes a shaft thrust bearing 56, which contacts one end of the shaft 10. Stator core 8 is located around an armature coil 9 outside the bearing housing unit 90.

Still referring to FIG. 7, the fourth preferred embodiment of the ball bearing according to the current invention is described more fully in the following. The ball bearing includes a first movable ball holding portion 92. The first movable ball holding portion 92 is a ring located inside the bearing housing unit 90 near the receiving plate 94 and has an angled surface 92*a* with respect to the longitudinal axis of the shaft 10. In addition, the receiving plate 94 includes the first ball holding surface 94*a* at a predetermined angle with respect to a longitudinal axis of the shaft 10 for keeping the balls 59*a* and 59*b* in contact with the shaft 10. A donut-shaped spring 100 urges the first movable ball holding portion 92 towards the receiving plate 94. As the first movable ball holding portion 92 vertically slides towards the receiving plate 84, balls 59*a* and 59*b* are urged towards the shaft 10 to make a contact. In summary, the first ball holding surface 94*a*, the first movable ball holding portion 92 and the shaft 10 together restrict the movement of the balls 59*a* and 59*b* in both vertical as well as horizontal directions. A ball retainer 95 also restricts a horizontal distance between the balls 59*a*, 59*b* and the shaft 10. These two tapered portions 92*a* and 94*a* and the shaft 10 together at three points of contacts restrict the position of the balls 59*a* and 59*b*.

Similarly, on the free-end side of the shaft 10, the fourth preferred embodiment of the ball bearing according to the current invention is described more fully in the following. The ball bearing includes a second movable ball holding portion 91. The second movable ball holding portion 91 is a ring located inside the bearing housing unit 90 near the top of bearing housing unit 90 and has an angled surface 91*a* with respect to the longitudinal axis of the shaft 10. In addition, the bearing housing unit 90 includes a second ball holding surface 90*a* at a predetermined angle with respect to a longitudinal axis of the shaft 10 for keeping the balls 61*a* and 61*b* in contact with the shaft 10. The other end of the donut-shaped spring 100 urges the second movable ball holding portion 91 towards a top surface of the housing unit 51. As the second movable ball holding portion 91 vertically slides away from the receiving plate 94, balls 61*a* and 61*b* are urged towards the shaft 10 to make a contact. In summary, the second ball holding surface 91*a*, the second movable ball holding portion 11 and the shaft 10 together restrict the movement of the balls 61*a* and 61*b* in both vertical as well as horizontal directions. A ball retainer 96 also restricts a distance between the balls 61*a*, 61*b* and the shaft 10. These two tapered portions 91*a* and 90*a* and the shaft 10 together at three points of contacts restrict the position of the balls 61*a* and 61*b*. Since the donut-shaped spring 100 is shared for the first and second movable ball holding portion 92 and 91, the construction of the third preferred embodiment of the ball bearing according to the current invention is simplified.

Figure 8:
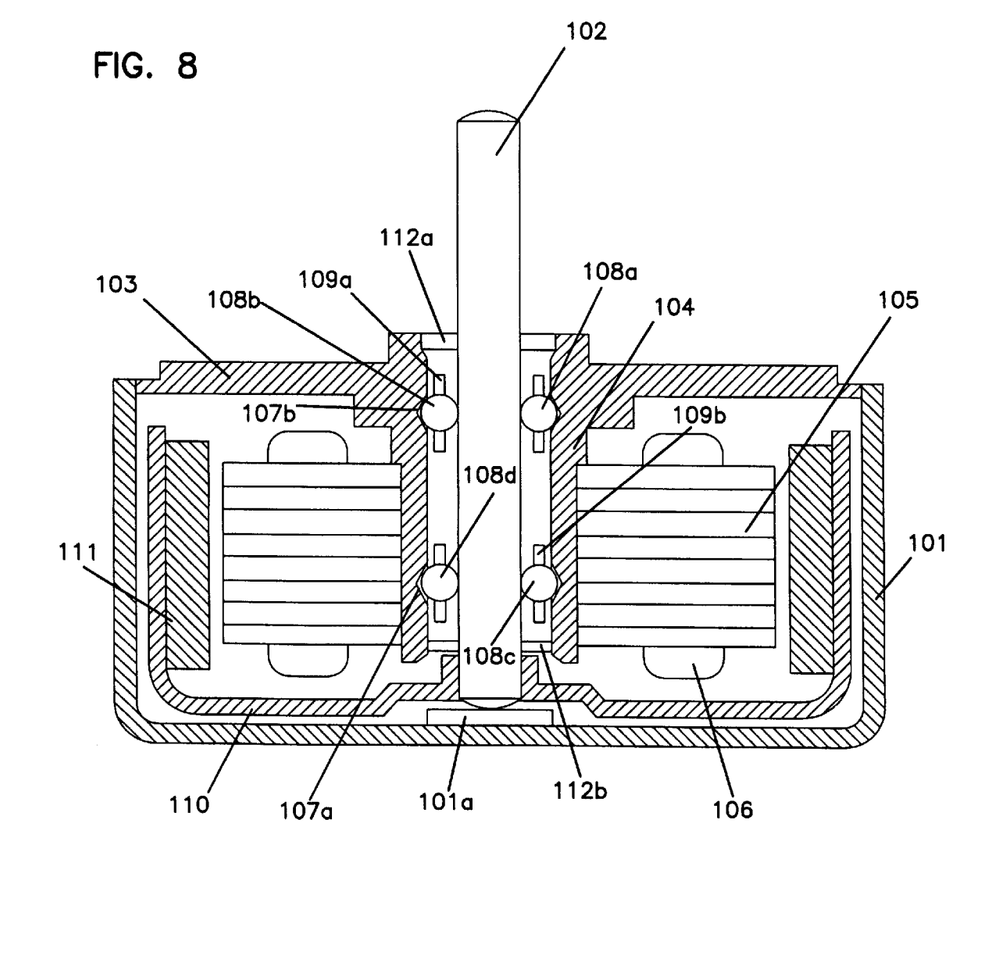
FIG. 8 illustrates a fifth preferred embodiment of the low friction ball bearing according to the current invention in a cross sectional view of a small cored motor.

Now referring to FIG. 8, a fifth preferred embodiment of the low friction ball bearing according to the current invention is illustrated in a cross sectional view of a small cored motor. A cored motor includes a cup-shaped housing unit 101 having side walls and a top unit 103 joining the side walls. The top unit 103 includes a centrally located opening for a shaft 102 to extend outside the top unit 103. The housing unit 101 also includes a rotor 110 which further includes a ring magnet portion 101 located on inside circumference areas of the rotor 110. The top unit 103 is integrally constructed with a cylindrical bearing housing unit 104, and the cylindrical bearing housing unit 104 has an opening at each end. A shaft thrust bearing 10 1a is located at the bottom of the housing unit 101, which contacts one end of the shaft 102. Stator core 105 is located around an armature coil 106 outside the bearing housing unit 104.

Still referring to FIG. 8, the fifth preferred embodiment of the ball bearing according to the current invention is described more fully in the following. The ball bearing includes ball holding indentation surfaces 107*a* and 107*b*. Each of the ball holding indentation surfaces 107*a* and 107*b* is located on an inner surface of the ball bearing housing unit 104 for guiding or at least partially holding a predetermined number of balls 108*a* through 108*d*. The ball holding indentation surfaces 107*a* and 107*b* has a rotated V-shape when seen in a cross section along the longitudinal axis of the shaft 102. Ball retainers 109*a* and 109*b* are located between the ball bearing housing unit 104 and the shaft 102 and are made of flexible plastic material such as nylon. The ball retainers 109*a* and 109*b* have an inverted crown-shaped configuration and retain balls in indented portions. Since the indented portions are separated by a predetermined distance, the balls 108*a* through 108*d* are kept from each other at the predetermined distance during rotation. Washers 112*a* and 112*b* are located at each opening of the ball bearing housing unit 104 for preventing lubricant from leaking. An inner edge of the wasters 112*a* and 112*b* contacts the shaft 102 while an outer edge is allowed to rotate with respect to the ball bearing housing unit 104. In the alternative, an outer edge of the wasters 112*a* and 112*b* contacts the ball bearing housing unit 104 while an inner edge is allowed to rotate with respect to the shaft 102.

Either space is treated oil to further reduce the leakage. In summary, the ball holding indentation surfaces 107*a* and 107*b*, the ball retainers 109*a* and 109*b* as well as the shaft 102 together restrict the movement of the balls 108*a* through 108*d* in both vertical as well as horizontal directions.

Figure 9:
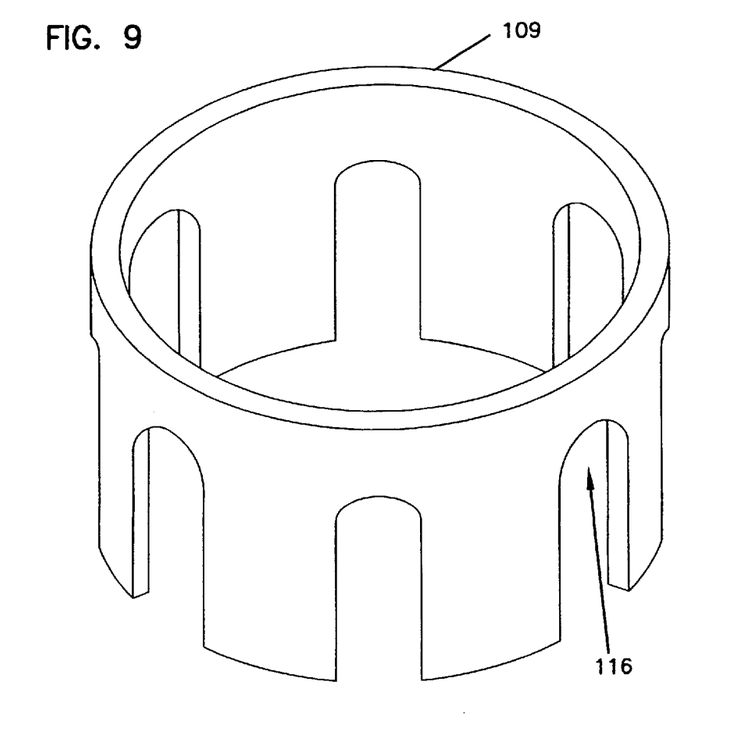
FIG. 9 illustrates one exemplary ball retainer in a perspective view.

Referring to FIG. 9, one exemplary ball retainer 109 is illustrated in a perspective view. The inverted crown-shape configuration has a predetermined number of indent portions 116 where balls are maintained at a certain distance from each other during rotation. Although the ball retainer 109 is illustrated with a relatively thick layer of resin, a thin resilient material can be used for making the ball bearing unit thinner.

Figure 10:
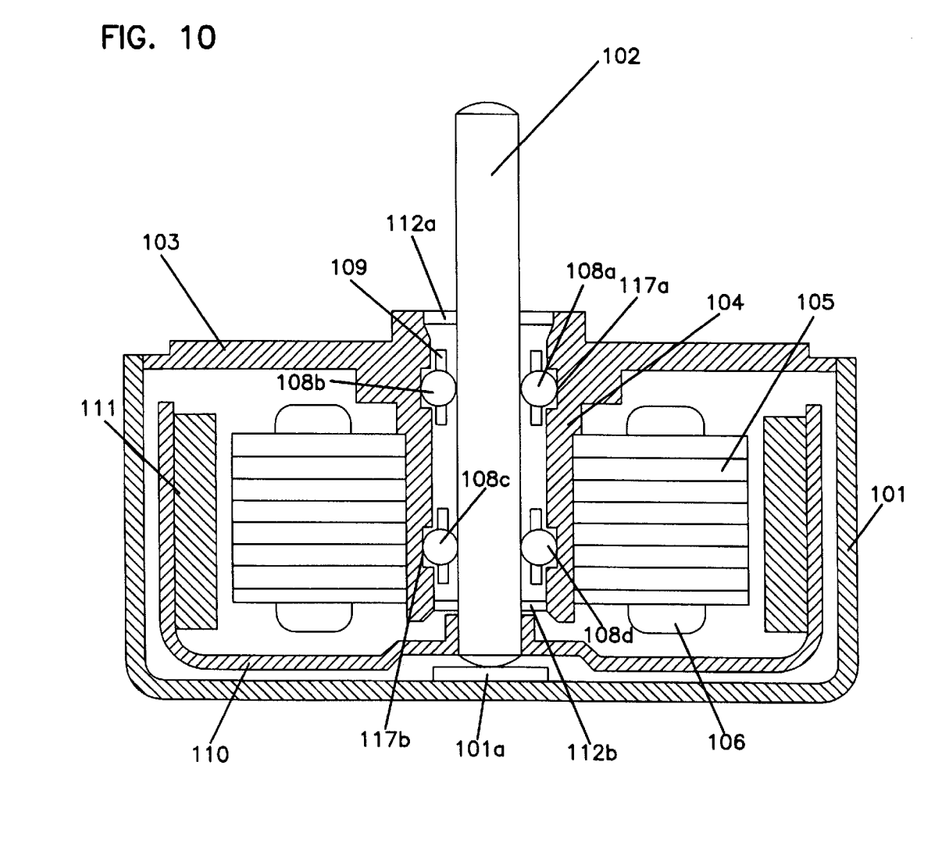
FIG. 10 illustrates a sixth preferred embodiment of the low friction ball bearing according to the current invention in a cross sectional view of a small cored motor.

Now referring to FIG. 10, a sixth preferred embodiment of the low friction ball bearing according to the current invention is illustrated in a cross sectional view of a small cored motor. The sixth preferred embodiment is substantially the same as the fifth preferred embodiment except that the indentation surface has a different configuration. A cored motor includes a cup-shaped housing unit 101 having side walls and a top unit 103 joining the side walls. The top unit 103 includes a centrally located opening for a shaft 102 to extend outside the top unit 103. The housing unit 101 also includes a rotor 110 which further includes a ring magnet portion 111 located on inside circumference areas of the rotor 110. The top unit 103 is integrally constructed with a cylindrical bearing housing unit 104, and the cylindrical bearing housing unit 104 has an opening at each end. A shaft thrust bearing 101*a* is located at the bottom of the housing unit 101, which contacts one end of the shaft 102. Stator core 105 is located around an armature coil 106 outside the bearing housing unit 104.

Still referring to FIG. 10, the sixth preferred embodiment of the ball bearing according to the current invention is described more fully in the following. The ball bearing includes ball holding indentation surfaces 117*a* and 117*b*. Each of the ball holding indentation surfaces 117*a* and 117*b* is located on an inner surface of the ball bearing housing unit 104 for guiding or at least partially holding a predetermined number of balls 108*a* through 108*d*. The ball holding indentation surfaces 117*a* and 117*b* has a rectangular shape when seen in a cross section along the longitudinal axis of the shaft 102. Ball retainers 109*a* and 109*b* are located between the ball bearing housing unit 104 and the shaft 102 and are made of flexible plastic material such as nylon. The ball retainers 109a and 109b have an inverted crown-shaped configuration and retain balls in indented portions. Since the indented portions are separated by a predetermined distance, the balls 108a through 108d are kept from each other at the predetermined distance during rotation. Washers 112a and 112b are located at each opening of the ball bearing housing unit 104 for preventing lubricant from leaking. An inner edge of the wasters 112a and 112b contacts the shaft 102 while an outer edge is allowed to rotate with respect to the ball bearing housing unit 104. In the alternative, an outer edge of the wasters 112a and 112b contacts the ball bearing housing unit 104 while an inner edge is allowed to rotate with respect to the shaft 102. Either space is treated oil to further reduce the leakage. In summary, the ball holding indentation surfaces 107a and 107b, the ball retainers 109a and 109b as well as the shaft 102 together restrict the movement of the balls 108a through 108d in both vertical as well as horizontal directions.

In an alternative embodiment, the cross sectional shape of the above described ball holding indentation surfaces is a mixture of certain shapes including a rotated V-shape, a rotated U-shape and a rectangular shape rather than a uniform shape. In another alternative embodiment, the ball bearing housing unit is integrated with the cup-shaped housing unit 101 near the thrust bearing rather being integral with the top unit.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, or a combination of both, the changes are within the principles of the invention to the full extent indicated by the broad general meaning of the terms in which the appended claims are expressed.

What is claimed is:

1. A ball bearing for supporting a shaft in a motor, comprising:

a plurality of balls;

a bearing housing unit located adjacent to the shaft, the shaft having a continuously cylindrical surface, said bearing housing unit having a first ball holding surface at a first predetermined angle with respect to a longitudinal axis of the shaft for keeping each of said balls in contact with the continuously cylindrical surface of the shaft; and a biased movable ball holding portion located near said first ball holding surface, said biased movable ball holding portion having a second ball holding surface at a second predetermined angle with respect to the longitudinal axis of the shaft for urging each of said balls towards the continuously cylindrical surface of the shaft.

2. The ball bearing for supporting a shaft in a motor according to claim 1 wherein said biased movable ball holding portion is integral with said bearing housing unit.

3. The ball bearing for supporting a shaft in a motor according to claim 1 wherein said biased movable ball holding portion further includes a coil spring.

* * * * *